United States Patent

[11] 3,593,270

| [72] | Inventors | Richard E. Walker<br>617 McCreadyAve., Cadiz, Ohio 43907;<br>James D. Heckelman, Rte. #1, Huron, Ohio 44839 |
|---|---|---|
| [21] | Appl No. | 652,184 |
| [22] | Filed | July 10, 1967 |
| [45] | Patented | July 13, 1971 |

[54] LIQUID LEVEL SENSING AND INDICATING SYSTEM
13 Claims, 6 Drawing Figs.

| [52] | U.S. Cl. | 340/59, 340/244, 307/304 |
|---|---|---|
| [51] | Int. Cl. | B60q 1/00, H01h 29/00 |
| [50] | Field of Search | 340/59, 244, 244 C, 249; 200/152.4, 61.2, ; 73/304 |

[56] References Cited
UNITED STATES PATENTS

| 3,257,643 | 6/1966 | Jensen | 340/244 X |
| 3,339,411 | 9/1967 | Riffie | 340/244 X |
| 3,416,131 | 12/1968 | MacKenzie | 340/244 X |
| 3,461,447 | 8/1969 | Marouby | 340/59 X |
| 2,385,161 | 9/1945 | Pinkerton | 340/244 |

*Primary Examiner*—Alvin H. Waring
*Attorney*—William P. Hickey

ABSTRACT: A system for preventing overheating of liquid cooled internal combustion engines comprising an improved radiator probe which cannot short out to produce a malfunction, an electronic warning circuit and an electronic test circuit so constructed that the test circuit can be relied upon to sense a failure in the alarm circuit without being masked by a compensating failure in the probe circuit.

INVENTORS
RICHARD E. WALKER
JAMES D. HECKELMAN

BY William P. Hickey
ATTORNEY

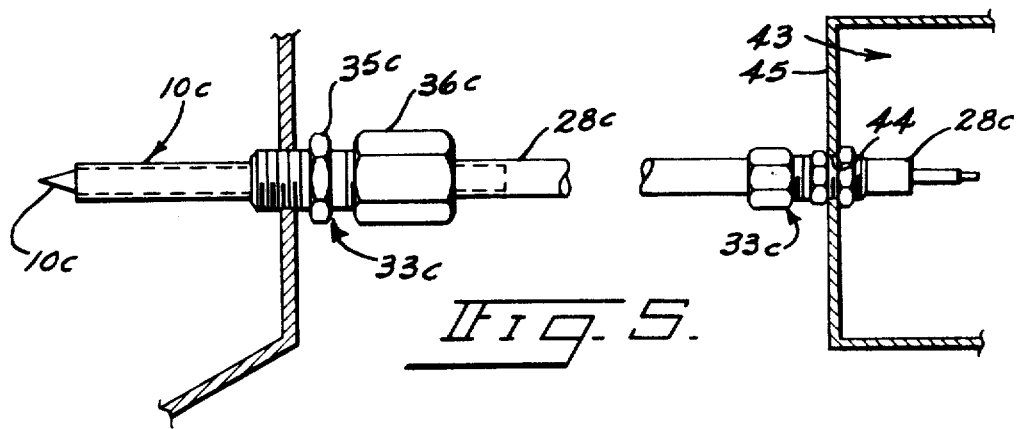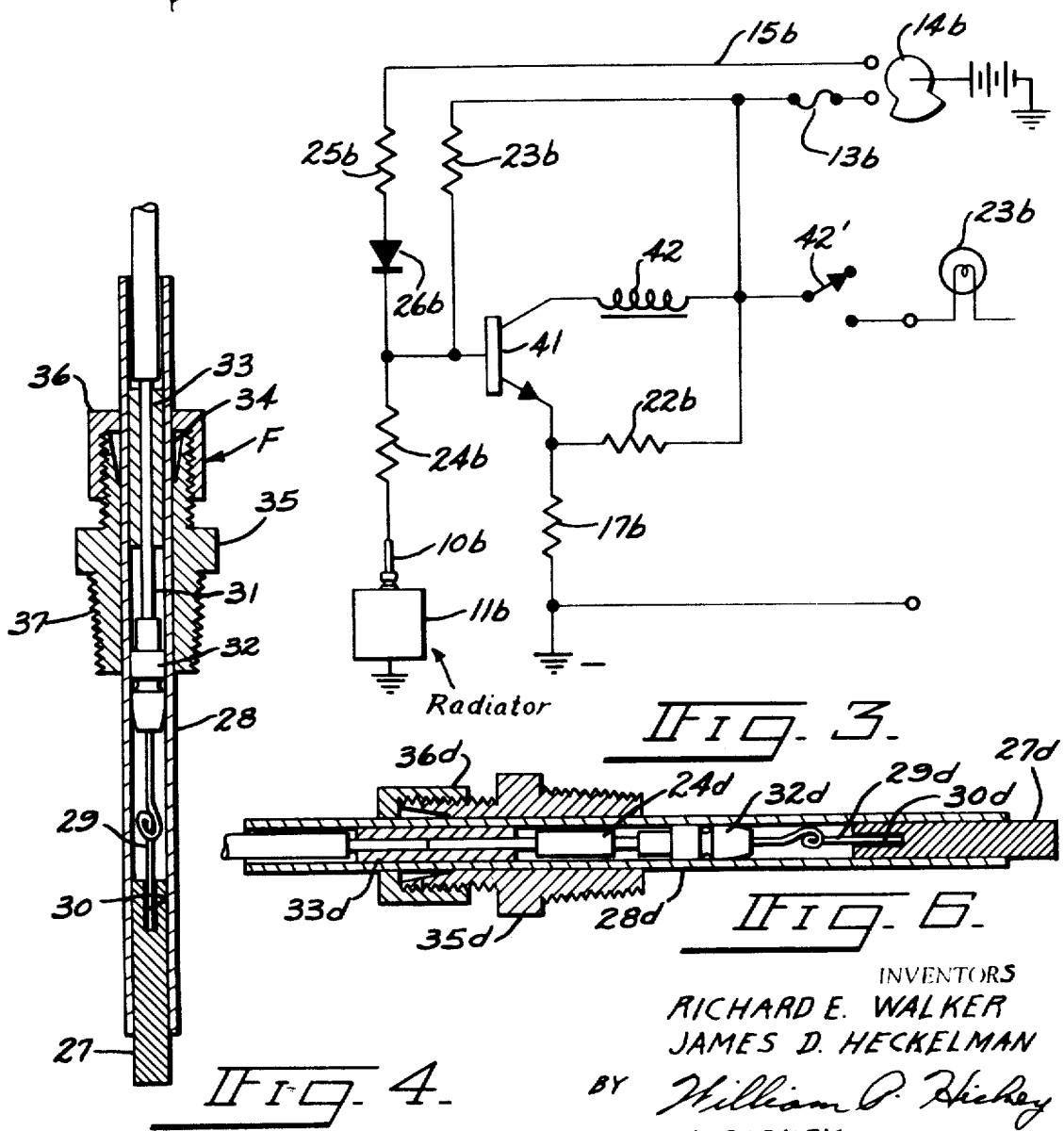

3,593,270

LIQUID LEVEL SENSING AND INDICATING SYSTEM

CROSS-REFERENCE TO RELATED APPLICATIONS

This application is a continuation-in-part of our copending application Ser. No. 344,641, filed Feb. 13, 1964, now U.S. Pat. No. 3,333,258 and entitled FOOLPROOF SYSTEMS FOR SENSING BOTH NORMAL AND ABNORMAL CONDITIONS.

BACKGROUND OF THE INVENTION

The liquid cooled internal combustion engines used in automotive vehicles employ a relatively small amount of liquid which is rapidly circulated in sequence through the cooling jacket of the engine and a heat dissipating radiator. Large amounts of heat are generated by internal combustion engines and the small amount of liquid used in the cooling system must, therefore, be recirculated at a rapid rate. If the recirculation is stopped due to either a pump failure or a loss of fluid, the engine becomes quickly overheated and damaged.

The commercial devices which have been used heretofore, to provide a warning of engine overheating have for the most part been temperature actuated devices, the sensing element of which are either a vapor pressure bulb, or a liquid thermal expansion element. A considerable time lag can exist between the time that an overheating condition arises, and a time that such temperature sensing devices perform their alarm function, so that these prior art systems are only adequate to sense a gradual rise in temperature of the engine beyond a safe limit. If a sudden complete failure occurs by reason of a pump failure or a large leak in the system, the temperature of the engine is not carried to the temperature sensing element and the engine can be damaged beyond repair before any alarm is given.

SUMMARY OF THE INVENTION

The present invention relates to a system for preventing overheating of liquid cooled internal combustion engines which is triggered or actuated by a malfunction which occurs prior to the overheating of the engine. So long as liquid is present in the cooling chambers of the engine, there can be no instantaneous rise in temperature, even though recirculation of the liquid has stopped because the cooling liquid will boil and thereby remove heat from the engine. Boiling, however, will result in a loss of coolant from the system to produce a condition similar to that which occurs upon a bursting or a rupture anywhere in the cooling system.

The invention employs a liquid sensing element or probe so located as to sense a depletion of coolant from its normal liquid level. The invention further includes a simple, rugged and reliable amplifying and signal circuit that is normally energized by current flowing through the liquid sensing probe and which circuit produces an alarm signal when the current through the probe circuits ceases. Because the system so far described, operates continuously, the invention further includes a simple and reliable test circuit which is operated periodically during normal operation of the engine, to show that the probe circuit, and amplifying and signal circuit are operating properly.

In the system above described, a certain type of malfunction in the probe circuit can prevent the test circuit from producing the above described indication. According to the invention, an electrical probe construction is provided which prevents this type of failure from occurring and which, therefore, makes the test circuit reliable. Also according to the invention, the amplifying the signal system, and the test circuit are operated by the same source of electrical energy using proportioned voltages, which it has been discovered need be proportioned in a particular manner in order to assure reliable operation.

BRIEF DESCRIPTION OF THE DRAWINGS

FIG. 3 is a wiring diagram of another embodiment of the invention using a 12 volt DC negative ground power supply system;

FIG. 4 is a longitudinal sectional view of the probe shown in FIGS. 1—3;

FIG. 5 is a longitudinal view of another embodiment of probe; and

FIG. 6 is a longitudinal view of still another embodiment of probe.

DESCRIPTION OF THE PREFERRED EMBODIMENTS

Figure 1:
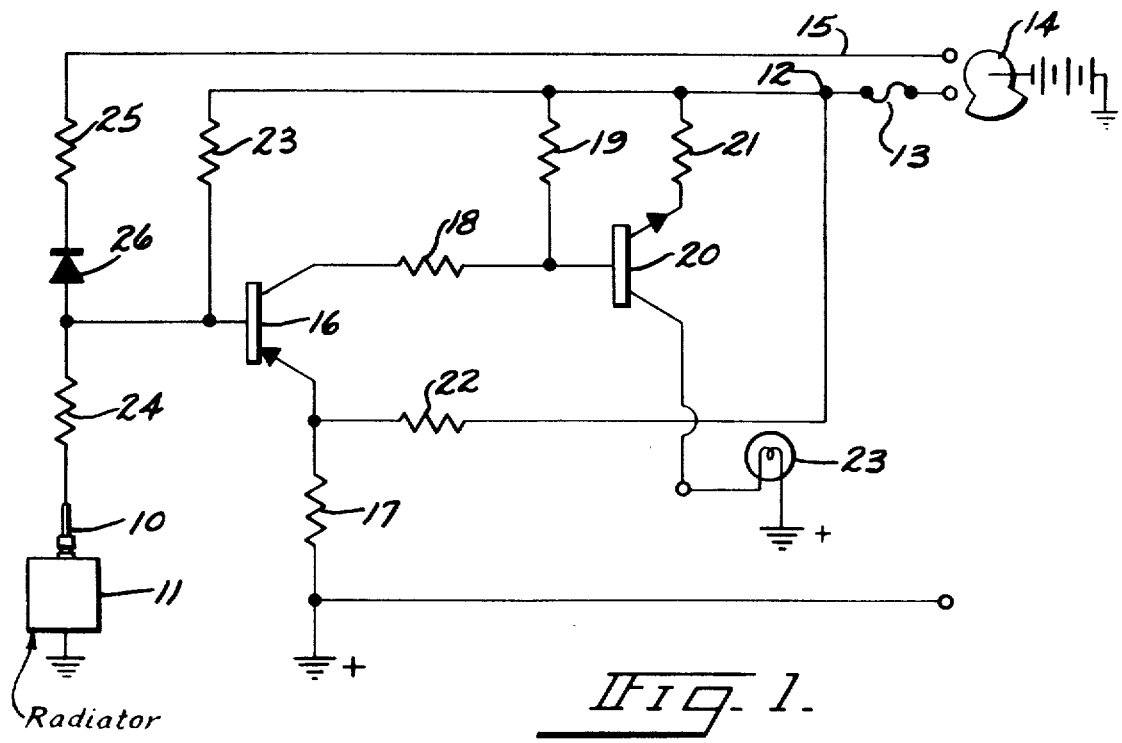
FIG. 1 is a wiring diagram of one embodiment of the invention and which is actuated by a 12 volt DC positive ground system.

In the circuit of FIG. 1, the probe 10 is immersed in liquid container 11, which may be the coolant system of an internal combustion engine. In the embodiment shown, the container 11 is at ground, whereas a negative 12 volts is applied to the power supply line 12 through a fuse 13 and a three position switch 14. The switch 14 has an open position shown, a running position wherein it makes contact to the line leading to the fuse and a test position wherein both the line leading to the fuse and a test line 15 are energized. A PNP-transistor 16 has its emitter connected to the ground through resistor 17. The collector of transistor 16 is connected to the line 12 through series resistances 18 and 19, as well as through a circuit paralleling resistor 19 and including the base of an NPN-transistor 20 and resistor 21 in the emitter circuit of transistor 20. The emitter of transistor 16 is also connected to the power supply 12 through a resistor 22 which in combination with the resistor 17 provide a voltage dividing circuit for the emitter of transistor 16. The collector of transistor 20 is connected to ground through a warning indicator lamp 23, which when lit, indicates that the probe 10 is not conducting to ground through the liquid in the container 11. The probe 10 is energized by the line 12 through a resistor 23 that is connected to the base of the transistor 16 and which is in series with resistor 24 connected between the base of the transistor 16 and the probe 10. During normal operation, the rotor of switch 14 will only contact the line leading to conductor 12 and the resistors 23 and 24 are of such value as to hold a positive bias on the base of transistor 16 to cause transistor 16 to be nonconductive. Transistor 20 and its attendant circuitry including the resistors 18, 19, and 21 can be considered to be an electronic switch causing the lamp 23 to be lighted whenever the transistor 16 is "fired" or caused to be conductive. The transistor 16 and its attendant circuitry can be considered to be an amplifier for controlling the electronic switch. As previously indicated, therefore, the resistors 23 and 24 must be of such value as to normally hold the transistor 16 "biased off." The transistors 16 and 20, therefore, are normally held nonconductive until an emergency arises, or until the circuitry is tested as will now be described.

Inasmuch as the amplifying circuit and the switch circuit for the lamp 23 are normally nonconductive, it will be apparent that a failure anywhere in this system will prevent a warning signal from being given. The ratio of the resistors 23 and 24 must be such that the voltage which they establish reliably offsets variations in the probe 10, while still leaving a sufficient voltage to assure reliable actuation of the switching circuitry. The switching circuit must be reliably actuated or there can be no reliable alarm signal.

The circuitry so far described is tested during normal operation by a test circuit comprising the test line 15, resistor 25, and diode 26 which is connected in series to the base of the transistor 16. It has been found that the ratio of the resistor 24 to 23 must be less than approximately 1, and it has also been found that the ratio of the resistors 24 and 24 must be generally less than 1. The diode 26, while not necessary in all instances, prevents a positive surge from the test circuit from preventing an accurate testing of the remainder of the circuitry, since the positive surge could turn the lamp off when the lamp should be on, and it would also be possible for a short to ground in the test circuitry to prevent an alarm signal when an emergency in fact has arisen.

The reliability of the whole system above described is dependent upon a reliable construction of the probe 10. It will be seen that the electrode 27 of the probe 10 must never become shorted to ground, or otherwise an alarm cannot be given, and it will also be seen that the probe 10 must be reliable even under conditions of severe vibration or an extremely annoying alarm signal will be given. Both the problem of shorting to ground, and the problem of maintaining electrical conductivity are made severe by the extreme amount of vibration produced by an internal combustion engine. This problem is aggravated by the amount of cantilever which the electrode 27 must have from its support. This problem is further increased when the electrode 27 is made of a fragile material such as carbon.

In the probe construction shown in FIGS. 1–4, the electrode 27 is supported by one end of a section of plastic tubing which is capable of withstanding pressure and which has an interference fit with the electrode 27. The electrode 27 may in some instances be made of a metal, as for example, stainless steel, but in the embodiment shown in FIG. 1 is made of carbon. One end of a section of stranded wire 29 is securely fastened to the inner end of the electrode 27. In the embodiment shown, this is accomplished with one end of the stranded wire being inserted in an axial drilling 30 in the carbon electrode 27. The wire is securely held in place by the compaction of copper powder between the wire 29 and the sidewalls of the axial drilling 30. The stranded wire 29 is preferably looped, as will later be explained, and the other end of the stranded wire 29 is securely connected to a relatively stiff conductor wire 31 by a connector 32 opposite ends of which are crimped to the wires 29 and 31 respectively, and/or soldered thereto.

The probe structure so far described is supported by a metal sleeve 33 that is soldered to the wire 31 above the connector 32 and which snugly fits within the plastic tubing 28. The metal sleeve 33 is in turn supported by a compression fitting F comprising a ferrule 34 which surrounds the tubing 28 and which is squeezed between the fitting base 35 and the fitting cap 36 when the cap 36 is threaded onto the base 35. The compression of the ferrule 34 causes it to grow radially inwardly to deform the plastic tubing 28 against the sleeve 33 to both effect a seal therewith and to provide a resilient mechanical grasp of the tube 28 and the sleeve 33. The fitting base 35 is in turn provided with threads 37 or other means whereby it is sealingly attached to the container 11, which in the present instance is a radiator of the internal combustion engine. Before the tube 28 is slid from a position over the connector 32 to engage the electrode 27, the end of the tubing 28 is preferably filled with a resilient sealing compound such as a silicone or a flexible epoxy resin to fill the space between the electrode 27 and connector 32. This not only provides an additional fluid seal, but supports the looped wire 29. The flexible resin also increases the mechanical supports for the electrode 27 by means which prevents most of the vibrations from being transmitted to the electrode 27. It will now be seen that the plastic tubing 28 projects from a position inside of the container, or radiator 11, to a position well outside of the container. The tubing 28 is an electrically insulating flexible plastic capable of withstanding extremely high pressures, and in the embodiment shown is made of nylon and is capable of withstanding an internal pressure of 1,000 pounds per square inch. The nylon is nonwetted by the coolant which in most instances is an aqueous solution. It will further be seen that the construction provides an extremely reliable type of liquid seal, which nevertheless, if leakage does occur is conducted to a point well removed from the container structure. Should the leakage seep out of the top of the tube 28, it will not wet the outside of the tube to provide a path to ground. It will further be seen that leakage of the tube or liquid trapped within the tube does not effect operation of the probe since its retention in the tubing 28 merely places it in series with the electrode 27 and does not prevent discontinuity to ground when the liquid level falls out of contact with the electrode 27. The probe so far described is substantially that in the above referred to parent application.

Figure 2:
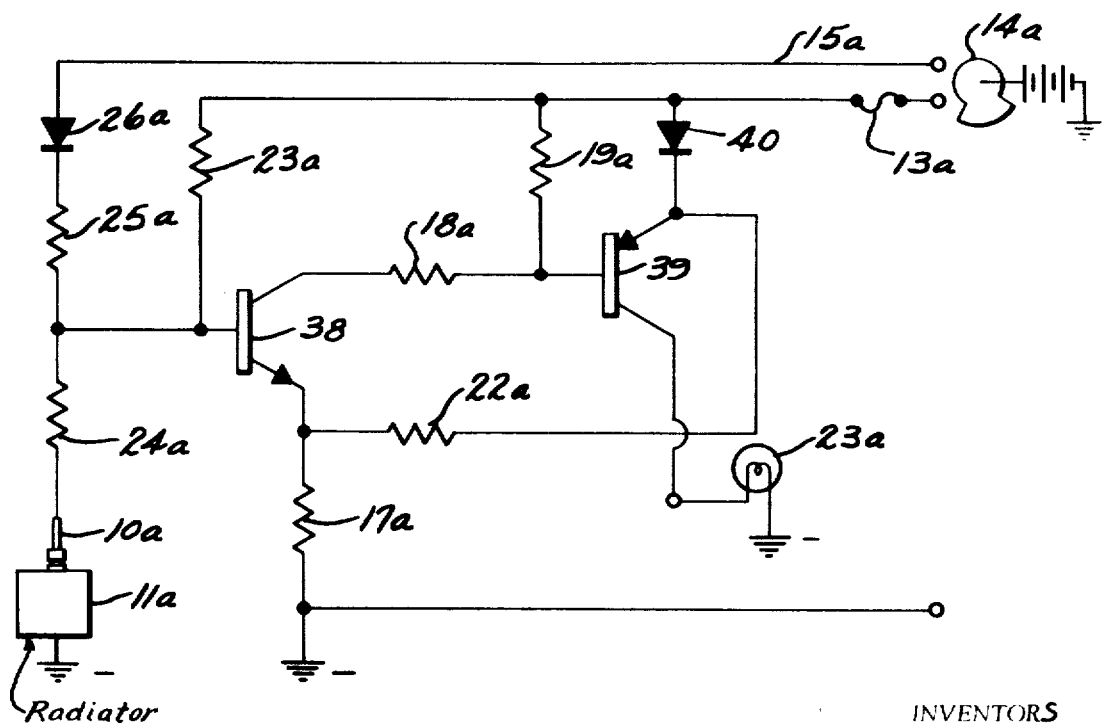
FIG. 2 is a wiring diagram of another embodiment of the invention using a 24 volt DC negative ground power supply system.

For some applications, the arrangement shown in FIG. 2 is to be preferred. FIG. 2 is generally similar to FIG. 1 and differs principally therefrom in that it is arranged to operate with a 24 volt negative ground. Those portions of FIG. 2 which are generally similar to corresponding portions of FIG. 1 are designated by a like reference numeral characterized further in that a suffix "a" is affixed thereto. The ratio of resistance 17a to 22a and the ratio of resistance 24a to 23a are such that the NPN-transistor 38 is biased off when the water level engages probe 10a and the probe is conducting. When the liquid level drops below the probe 10a, resistor 23a causes the small base current of the transistor to assume a more positive level at the transistor to make the transistor conductive. A PNP-transistor 39 has its base connected to the junctions of resistors 18a and 19a. When transistor 38 is not conductive, the small base current in transistor 39 through resistor 19a causes a positive voltage level at the transistor which biases the transistor 39 off. When transistor 38, however, is conductive, the larger flow through the resistors 18a and 19a causes a drop in voltage level at the base of transistor 39 to make transistor 39 conductive to thereby light the lamp 23a in the collector circuit of transistor 39. A diode 40 is positioned in the emitter circuit of the transistor 39 and is also connected in series with resistors 17a and 22a. The diode 40 produces a reverse bias on the transistor 39 by making the emitter negative with respect to the base. This prevents leakage current from the base to the collector from making the base negative with respect to the emitter and thereby turning the transistor 39 on. Diode 40 also prevents a reverse surge through the transistor 39 to protect the transistor 39. When the probe 10a is conductive and the switch 14a is turned to the test position, current flow through the resistors 25a and 24a produces a sufficiently positive voltage at the base of transistor 38 to turn transistor 38 on and in turn light the lamp 23a.

In some instances, it will be desirable to substitute a relay for the electronic switch circuitry of the preceding embodiments. FIG. 3 is one such embodiment wherein a relay is used as a switch for controlling the alarm lamp. Those portions of FIG. 3 which correspond to similar portions of the preceding embodiments are designated by a like reference numeral characterized further in that a suffix "b" is affixed thereto. The embodiment shown in FIG. 3 comprises a 12 volt DC negative ground system. The embodiment has an NPN-transistor 41 as its trigger and amplifier. During operation when the probe 10b is conductive and the switch 14b is in the run position, the current flow through the resistors 23b and 24b establishes a negative potential on the base relative to the emitter of transistor 41 to bias the transistor 41 off. When the probe 10b is conductive and the switch 14b is moved to the test position, the current flow through the resistors 25b and 24b is such as to establish a positive bias at the base of transistor 41 relative to its emitter so as to make the transistor conductive. When the transistor 41 is conductive, current flow through relay 42 in the collector circuit of the transistor 41 pulls the relay in to close its contact 42' to energize the warning lamp 23b. When the switch 14b is in the running position and the probe 10b becomes nonconductive, the small base current flow through the resistor 23b establishes a positive bias on the transistor 41 relative to its emitter to make the transistor conductive and in turn provide the desired warning signal.

It will now be seen that there must at all times be a reliable voltage signal to the base of the trigger transistor, and that there must also be sufficient voltage remaining to at all times assure reliable actuation of the switching circuitry. The following is a table of resistor values which have established reliable operation in the various embodiments

| Elements: | | Resistant values |
|---|---|---|
| 18 | ohm | 100 |
| 19 | do | 100 |
| 17 | do | 56 |
| 22 | do | 56 |
| 23 | do | 15,000 |
| 24 | do | 12,000 |
| 25 | do | 1,000 |
| 21 | do | 2.7 |
| 17a | do | 68 |
| 22a | do | 680 |
| 18a | do | 390 |
| 19a | do | 47 |
| 23a | do | 47,000 |
| 24a | do | 2,200 |
| 25a | do | 2,200 |
| 17b | do | 56 |
| 22b | do | 56 |
| 23b | do | 15,000 |
| 24b | do | 12,000 |
| 25b | do | 1,000 |
| 42 | ohm coil | 100 |

In some instances, it may be desirable or necessary to protect not only the probe from becoming shorted out, but to further assure that the conductor leading from the probe to the remainder of the circuit does not become shorted out. This is accomplished in the embodiments shown in FIG. 5. Those portions of the embodiment shown in FIG. 5 which are similar to corresponding portions of the embodiments shown in FIG. 1 are designated by like reference numerals characterized further in that a suffix "c" is affixed thereto. In the embodiments shown in FIG. 5, the crew compartment designated by the numeral 43 is located remotely from the probe 10c and the plastic tubing 28c is caused to extend from adjacent the tip of the probe all of the way into the compartment 43 through an opening 44 in the wall 45 of the crew compartment. A compression fitting similar to the fitting 33 is used to effect the seal at the point where the conductor goes through the crew compartment wall. The sleeve 32 need not be used, however, and the tubing can be caused to be compressed against the insulation of the conductor wire. In the embodiment shown in FIG. 5, all of the transistor circuitry is located within the crew compartment and it will now be seen that the vehicle in which it is installed could be driven through water without shorting out the probe, and without making the warning system inoperative.

FIG. 6 shows another embodiment of probe which is similar to FIG. 4 but differs principally therefrom in that the resistor 24 is incorporated within the probe. Those portions of the embodiment shown in FIG. 6 which correspond to those shown in FIG. 4 are designated by a like reference numeral characterized further in that a suffix "d " is affixed thereto. The probe shown in FIG. 6 will have advantages in those instances where it is desirable to have an indication of a short to ground in the lead wire leading from the probe to the rest of the circuitry, and particularly the electronic switch circuitry. Where the probe is used in the circuitry of FIG. 1, for example, a short in the wire between the resistor 24 and the base of the transistor 16 will, during normal operation, place a positive bias on the transistor 16 to hold the transistor "off." When the switch 14 is turned to the test position, a short to ground in the lead wire prevents the test circuit from placing a negative bias on the transistor 16, so that the transistor 16 will not be fired and the lamp 23 will not be lit during the testing operation. The fact that the lamp 23 is not lit when it should be lit provides a positive indication of a malfunction in this system.

In those instances where the internal combustion engine is started and stopped frequently, the switch 14 either preferably is, or is operated simultaneously with, the switch which controls the operation of the engine. With such an arrangement, the operator automatically tests the above system whenever the engine is started. When the above described circuitry is used to protect a gas or gasoline engine in which the explosive mixture is ignited by a sparking device, the switch 14 can be the ignition switch of the engine.

While the invention has been described in considerable detail, we do not wish to be limited to the particular embodiments shown and described, and it is our intention to cover hereby all novel adaptations, modifications, and arrangements thereof which come within the practice of those skilled in the art to which the invention relates.

We claim:

1. A system for sensing and indicating the liquid level of liquid cooled internal combustion engines having a radiator with a normal liquid level positioned remotely from the drivers compartment, a source of electrical energy at a potential different from ground, and an engine operating switch connecting to said source and having an "on" position for normal operation of the internal combustion engine, and a "test" position, said system comprising: a probe insulated from its surrounding and projecting below the liquid level of said radiator, first and second resistors connected in series circuit between said probe and said source of electrical energy, said first resistor being connected to the probe and the ratio of the resistance values of said first to said second resistors being no greater than approximately 1, a transistor between ground and said source and the base of which is connected to adjacent ends of said first and second resistors, said transistor being conductive when a biasing potential of the same type relative to ground as said source is supplied thereto, signal producing means in the emitter-collector circuit of said transistor effective to provide a warning signal when said transistor is conductive, a flexible plastic insulating tube one end of which surrounds said probe and the other end of which projects out of the radiator, said tube being nonwetted by the liquid in said radiator, a conductor extending through said tube from said probe establishing a circuit with said first resistor, means mounting said tube to said radiator and deforming said tube radially inwardly for effecting a seal relative to said conductor, and a third resistor connecting between said base of said transistor and said test position of said switch, said third resistor having a resistance value which makes the ratio of the resistance values of said first to said third resistors less than approximately 1.

2. The system of claim 1 in which the plastic tube extends from said probe to said drivers compartment and the sidewalls of which are impervious to the surroundings.

3. The system of claim 1 in which the first resistor is located within said plastic tube.

4. In a system for sensing and indicating the liquid level of liquid cooled internal combustion engines having a radiator with a liquid contacting probe therein positioned remotely from the drivers compartment, a source of electrical energy at a potential different from ground, and an engine operating switch connected to said source and having an "on" position for normal operation of the internal combustion engine, and a "start" position for the engine, said system comprising: first and second resistors connected in series circuit between the probe and the source of electrical energy, said first resistor being connected to the probe and the ratio of the resistance value of said first to said second resistors being no greater than approximately 1, a transistor the emitter and collector of which are connected between ground and said source, and the base of which is connected to adjacent ends of said first and second resistors, said transistor being conductive when a biasing potential of the same type relative to ground as said source is applied thereto, signal producing means in the emitter-collector circuit of said transistor effecting a warning signal when said transistor is conductive, and a third resistor connected between said base of said transistor and said "start" position of said switch, said third resistor having a resistance value which makes the ratio of the resistance values of said first to said third resistors no greater than approximately 1.

5. A system for sensing and indicating the liquid level of engines having a liquid coolant system, said system comprising:

an ignition switch having a test position and a run position, a sensor element in said coolant system establishing a short circuit to ground to the engine when contacted by liquid in said coolant system, first and second resistors in series between said sensor element and said run position of said ignition switch, a transistor having its base electrode connected to the junction of said first and second resistors, a solenoid in the emitter-collector circuit of said transistor, said solenoid having normally open contacts which are closed when said solenoid is energized, an indicator light connected to said contacts to indicate whether or not liquid is in contact with said sensor element, and means connecting said test position of said switch to the base of said transistor to actuate said system whether or not liquid is in contact with said sensor element.

6. A fluid level indicator comprising: a ground; a reservoir containing a conductive fluid and electrically connected to said ground; a probe submerged in said fluid, said probe and said fluid forming a connection to ground; an ignition switch with a power terminal and with test and run terminals; a transistor having a base connected to said probe and an emitter-collector circuit; a warning device, said emitter-collector circuit operating said warning device to energize said device when liquid is not in contact with said probe, and means connecting said test position of said ignition switch to said base of said transistor to actuate said transistor and operate said warning device whether or not said liquid is in contact with said probe.

7. A fluid level indicator adapted for use on vehicles, said fluid level indicator comprising: an ignition switch with a power terminal in conductive relationship with the battery and with test and run terminals; first control means including a transistor in conductive relationship between the ignition switch and ground and made conductive in the test condition of the ignition switch, said first control means including a probe disposed to a depth corresponding to the minimum acceptable level of the fluid level; second control means including a transistor normally nonconductive and conductively disposed between said run terminal and a lamp, said transistor in the second control means being driven conductive by an interruption of current flow in the first control means due to the fluid level dropping below a minimum acceptable level thereby lighting the lamp.

8. A fluid level indicator adapted for use with vehicles, said fluid level indicator comprising: an ignition switch with a power terminal in conductive relationship with the battery and with test and run terminals; a first transistor having its emitter and collector terminals connected between said ignition switch and ground, a first resistor in series between said first transistor and ground, a fluid level probe connected to the base of said first transistor, a second resistor connected between said ignition switch and said base of said first transistor, a second transistor connected between said ignition switch and ground with its base connected to the junction of said first transistor and said first resistor, and a lamp and diode positioned in the emitter-collector circuit of said second transistor.

9. An electrode assembly comprising: a carbon probe insulated from its surroundings for projecting below a liquid level, a flexible plastic insulating tube one end of which surrounds said carbon probe and the other end of which projects outwardly, an electrical conductor inside said tube extending from said carbon probe through said tube, support means surrounding said tube and deforming said tube radially inwardly for effecting a seal relative to said conductor, said tube being nonwetted by the liquid in said radiator, and having a clearance space between said conductor and the internal sidewalls of said tube adjacent said carbon probe, said conductor comprising a looped section of stranded metal wire located in said clearance space between said carbon probe and the portion of said tube deformed against said conductor, and whereby substantially all stress is relieved from the connection of said conductor to said carbon probe due to vibration.

10. The system of claim 9 in which said conductor has a metal sleeve soldered thereto, and said means for mounting said tube comprises a compression fitting which squeezes said tube and said sleeve.

11. The system of claim 10 having a flexible plastic in said tube encasing said looped wire and extending between said probe and said sleeve.

12. The system of claim 9 in which a resistor is positioned in said plastic tube in series circuit between said probe and said electrical conductor.

13. In a system for sensing and indicating the liquid lens of liquid cooled internal combustion engines having a radiator with a normal liquid level positioned remotely from the drivers compartment; a probe insulated from its surroundings and projecting below the liquid level of said radiator, a flexible plastic insulating tube one end of which surrounds said carbon probe and the other end of which projects out of the radiator, an electrical conductor inside said tube extending from a point inside said radiator through said tube into the drivers compartment, means mounting said tube to said radiator and deforming said tube radially inwardly for effecting a seal relative to said conductor, said conductor having electrical insulation thereon inside said tube and extending from said means out of the tube into said drivers compartment, said tube being nonwetted by the liquid in said radiator, and whereby the engine and radiator can run submerged in water without said system becoming inoperative.